United States Patent
Fukunaga et al.

(10) Patent No.: US 12,148,961 B2
(45) Date of Patent: Nov. 19, 2024

(54) OPERATION METHOD FOR HYDROGEN PRODUCTION APPARATUS AND CONTROL DEVICE FOR HYDROGEN PRODUCTION APPARATUS

(71) Applicant: ENEOS CORPORATION, Tokyo (JP)

(72) Inventors: Akihiko Fukunaga, Tokyo (JP); Toshio Tezuka, Tokyo (JP); Tadashi Seike, Tokyo (JP); Hirofumi Nishio, Tokyo (JP); Daisaku Tateishi, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 18/527,824

(22) Filed: Dec. 4, 2023

(65) Prior Publication Data

US 2024/0105970 A1    Mar. 28, 2024

Related U.S. Application Data

(63) Continuation of application No. 17/212,434, filed on Mar. 25, 2021, now Pat. No. 11,916,266, which is a
(Continued)

(30) Foreign Application Priority Data

Oct. 2, 2018    (JP) .................... 2018-187679

(51) Int. Cl.
*H01M 8/04089* (2016.01)
*B60L 50/70* (2019.01)
(Continued)

(52) U.S. Cl.
CPC .......... *H01M 8/04089* (2013.01); *B60S 5/02* (2013.01); *C01B 3/32* (2013.01); *H01M 8/04201* (2013.01);
(Continued)

(58) Field of Classification Search
CPC ......... H01M 8/04089; H01M 8/04201; H01M 8/0606; H01M 2250/20; C01B 3/32
See application file for complete search history.

(56) References Cited

U.S. PATENT DOCUMENTS

| | | | |
|---|---|---|---|
| 4,904,548 A | * | 2/1990 | Tajima ................ H01M 16/006 429/432 |
| 2001/0049038 A1 | * | 12/2001 | Dickman ............ H01M 8/0494 429/423 |

(Continued)

FOREIGN PATENT DOCUMENTS

| | | |
|---|---|---|
| CN | 1706988 A | 12/2005 |
| CN | 102473947 A | 5/2012 |

(Continued)

OTHER PUBLICATIONS

Machine Translation of WO-2018109858-A1 (Jun. 27, 2024) (Year: 2024).*

(Continued)

*Primary Examiner* — Matthew J Merkling
(74) *Attorney, Agent, or Firm* — GREENBLUM & BERNSTEIN, P.L.C.

(57) ABSTRACT

A hydrogen production supply system that produces hydrogen gas to be supplied to a hydrogen storage tank, the hydrogen production supply system including a control circuit configured to control an operation load ratio of the hydrogen production apparatus to a predetermined operation load ratio, to increase the operation load ratio of the hydrogen production apparatus to a first operation load ratio larger than the predetermined operation load ratio at first timing, and to decrease the operation load ratio of the hydrogen production apparatus to the predetermined operation load ratio from the first load operation ratio at second timing, wherein an increase in the operation load ratio at the first
(Continued)

timing takes precedence over a decrease in the operation load ratio at the second timing.

12 Claims, 5 Drawing Sheets

Related U.S. Application Data continuation of application No. PCT/JP2019/038268, filed on Sep. 27, 2019.

(51) Int. Cl.
  *B60S 5/02* (2006.01)
  *C01B 3/32* (2006.01)
  *H01M 8/04082* (2016.01)
  *H01M 8/0606* (2016.01)

(52) U.S. Cl.
  CPC ........... *H01M 8/0606* (2013.01); *B60L 50/70* (2019.02); *C01B 2203/1604* (2013.01); *C01B 2203/1609* (2013.01); *H01M 2250/20* (2013.01); *Y02T 90/40* (2013.01)

(56) References Cited

U.S. PATENT DOCUMENTS

| | | | |
|---|---|---|---|
| 2003/0164202 | A1 | 9/2003 | Graham et al. |
| 2004/0163731 | A1 | 8/2004 | Eichelberger et al. |
| 2005/0266285 | A1* | 12/2005 | Edlund ............ H01M 8/04753 429/444 |
| 2005/0276749 | A1 | 12/2005 | Noujima et al. |
| 2006/0024540 | A1* | 2/2006 | LaVen ................ H01M 8/0494 429/432 |
| 2008/0160367 | A1* | 7/2008 | Masui ............... H01M 8/04225 429/442 |
| 2012/0148933 | A1 | 6/2012 | Takashi et al. |

FOREIGN PATENT DOCUMENTS

| | | | | |
|---|---|---|---|---|
| JP | 2002-216296 | A | 8/2002 | |
| JP | 2004-116544 | A | 4/2004 | |
| JP | 2006-001797 | A | 1/2006 | |
| JP | 2007-100906 | A | 4/2007 | |
| JP | 2013-508645 | A | 3/2013 | |
| JP | 2016-170594 | A | 9/2016 | |
| JP | 2016-172672 | A | 9/2016 | |
| JP | 2018-071658 | A | 5/2018 | |
| JP | 2018-084329 | A | 5/2018 | |
| WO | WO-2018109858 | A1 * | 6/2018 | ............... C25B 1/04 |

OTHER PUBLICATIONS

Written Opinion issued of the International Patent Application No. PCT/JP2019/038268, dated Nov. 5, 2019, along with an English translation thereof.
Preliminary Report on Patentability issued in International Patent Application No. PCT/JP2019/038268, dated Apr. 15, 2021, along with an English translation thereof.
International Search Report issued in International Patent Application No. PCT/JP2019/038268, dated Nov. 5, 2019, along with an English translation thereof.
Official Communication received in Australian Application No. 2019353340, dated Jan. 27, 2022.
Official Communication Received in European Patent Office Application No. 19869777.3, dated May 23, 2022.
Official Communication Received in Australian Patent Application No. 2019353340, dated Oct. 6, 2022.
Chinese First Office Action (including English Language Translation thereof), issued Mar. 1, 2023, for the Chinese Counterpart Application No. 201980065711.8.
Office Action issued in Japanese Patent Application No. 2020-550398 dated Aug. 22, 2023, along with English translation thereof.
Office Action issued in corresponding Chinese Patent Application No. 201980065711.8 dated Sep. 27, 2023, along with English translation thereof.
Office Action issued in corresponding Japanese Patent Application No. 2020-550398 dated Jan. 9, 2024, along with a machine English translation.

* cited by examiner

OPERATION METHOD FOR HYDROGEN PRODUCTION APPARATUS AND CONTROL DEVICE FOR HYDROGEN PRODUCTION APPARATUS

CROSS-REFERENCE TO RELATED APPLICATION

This is a continuation of U.S. patent application Ser. No. 17/212,434, filed Mar. 25, 2021, which is a continuation of PCT/JP2019/038268, filed Sep. 27, 2019, which claims the benefit of Japanese Patent Application No. 2018-187679, filed on Oct. 2, 2018. The content of each application listed above is incorporated herein by reference in its entirety.

BACKGROUND OF THE INVENTION

Field of the Invention

The present invention relates to an operation method for a hydrogen production apparatus and a control device for the hydrogen production apparatus, for example, a method and an apparatus for controlling the operation of a hydrogen production apparatus disposed in an on-site station.

As fuel for vehicles, in addition to conventional fuel oils such as gasoline, recently, hydrogen fuel has attracted attention as a clean energy source. As a result, fuel cell vehicles (FCVs) powered by the hydrogen fuel have been developed. Hydrogen stations for the FCV include a hydrogen shipping center or an on-site hydrogen station (hereinafter, referred to as the on-site ST) that is a hydrogen production base, and an off-site hydrogen station (hereinafter, referred to as the off-site ST) that receives and sells hydrogen from the hydrogen production base (the hydrogen shipping center or the on-site ST). In the hydrogen station, to rapidly fill the FCV with hydrogen gas, a compressor for compressing the hydrogen gas to a high pressure and a plurality of accumulators (a multi-stage accumulator) for accumulating the hydrogen gas compressed to the high pressure by the compressor are disposed. By performing filling of the hydrogen gas while appropriately switching the accumulator to be used so as to greatly maintain a differential pressure between a pressure inside the accumulator and a pressure of a fuel tank of the FCV, the hydrogen station rapidly performs filling of the hydrogen gas from the accumulator into the fuel tank of the FCV.

In a hydrogen production apparatus (HPU: Hydrogen Product Unit) that produces the hydrogen gas, it is difficult to rapidly increase an operation load (or a hydrogen production amount). Therefore, at the on-site ST, generally, during business hours, the hydrogen production apparatus is continuously operated in a state of a load 100% (rated value). However, excess hydrogen gas that cannot be accumulated in the accumulator is discharged to the atmosphere (discarded). Such an operation is continued from the start to the end of business. As described above, there is a problem that a large amount of hydrogen gas is discarded even though the hydrogen gas is produced.

To deal with the above problem, many accumulators are prepared in the on-site ST, the hydrogen production apparatus is operated at the rated value, and, for example, one week's worth of hydrogen gas is produced and stored. Then, the amount of hydrogen gas to be discarded is reduced by stopping the hydrogen production apparatus until the hydrogen gas is insufficient. However, in the above method, there is a problem that it is necessary to prepare many accumulators and a facility at the on-site ST becomes excessive.

Therefore, there is a demand for a method for producing hydrogen with less waste without increasing a size of the facility.

Here, a method for predicting a load by averaging past results and creating an operation pattern of the hydrogen production apparatus is disclosed (for example, see JP-A-2006-001797). However, there is a problem that the prediction is just a prediction and is not always matched with an actual situation.

BRIEF SUMMARY OF THE INVENTION

According to one aspect of the present invention, an operation method for a hydrogen production apparatus that is disposed in a hydrogen station and produces hydrogen gas to be supplied to a fuel cell vehicle (FCV) arriving at the hydrogen station, the operation method includes:

starting up a hydrogen production apparatus up to a first operation load ratio preset for a rated operation;

increasing an operation load of the hydrogen production apparatus to a second load ratio larger than the first operation load ratio at first timing associated with an arrival of the FCV; and decreasing the operation load of the hydrogen production apparatus to a third operation load ratio smaller than the second operation load ratio at second timing associated with a completion of hydrogen filling into the FCV.

According to another aspect of the present invention, a control device for a hydrogen production apparatus that is disposed in a hydrogen station and produces hydrogen gas to be supplied to a fuel cell vehicle (FCV) arriving at the hydrogen station, the control device includes:

a start-up processing circuit configured to start up the hydrogen production apparatus up to a first operation load ratio preset for a rated operation;

a load increase processing circuit configured to increase an operation load of the hydrogen production apparatus to a second load ratio larger than the first operation load ratio at first timing associated with the arrival of the FCV; and a load decrease processing circuit configured to decrease the operation load of the hydrogen production apparatus to a third operation load ratio smaller than the second operation load ratio at second timing associated with a completion of hydrogen filling into the FCV.

DETAILED DESCRIPTION OF THE INVENTION

Embodiments below describe a method and an apparatus capable of producing hydrogen with less waste in accordance with an actual situation, without increasing a size of a facility.

First Embodiment

Figure 1:
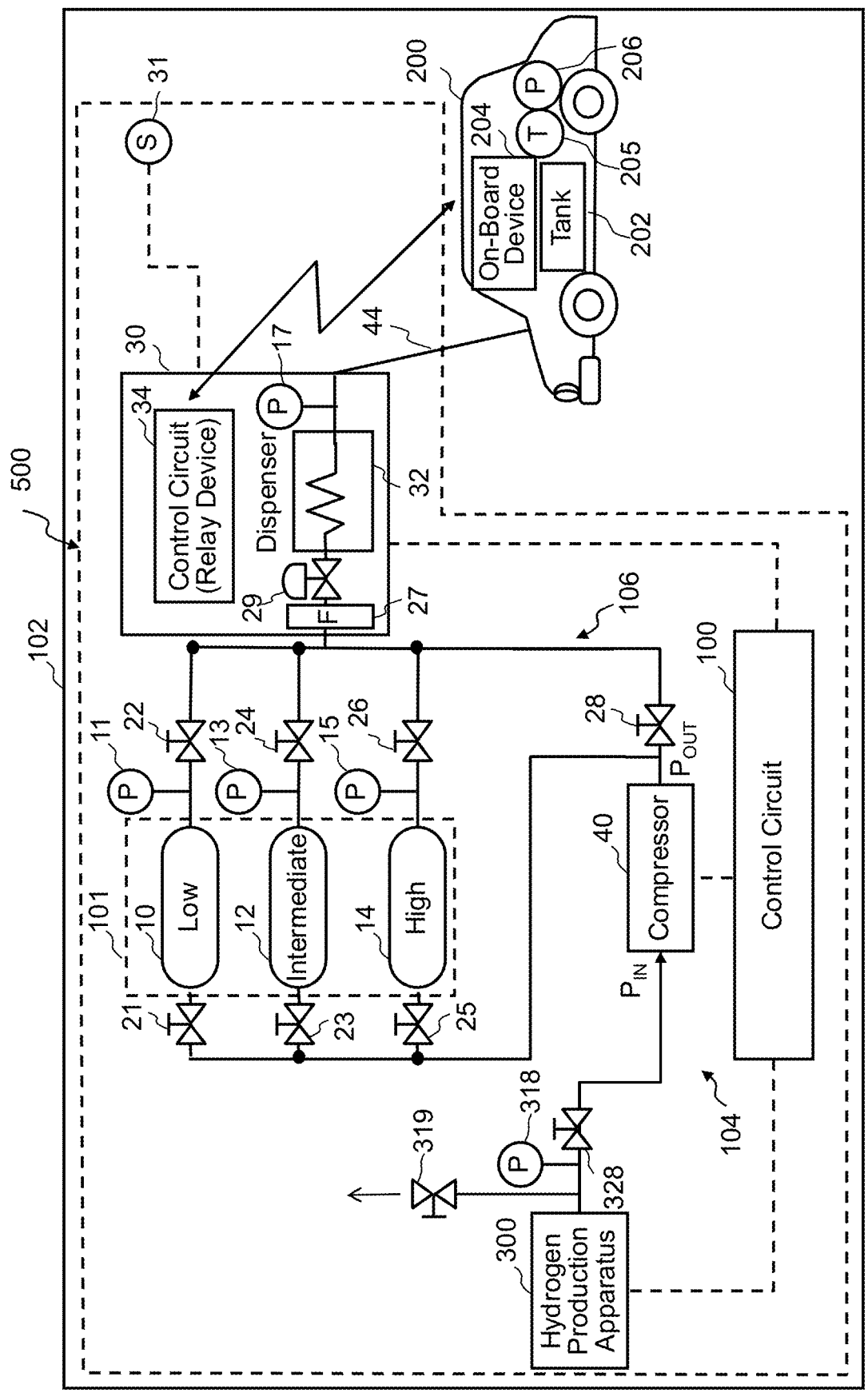
FIG. 1 is an example of a configuration diagram showing a configuration of a hydrogen gas supply system of a hydrogen station in a first embodiment.

FIG. 1 is an example of a configuration diagram showing a configuration of a hydrogen gas supply system of a hydrogen station in a first embodiment. In FIG. 1, a hydrogen gas supply system 500 is disposed in a hydrogen station 102. The hydrogen gas supply system 500 includes a hydrogen production apparatus 300, a multi-stage accumulator 101, a dispenser 30 (measuring machine), a compressor 40, a sensor 31, and a control circuit 100.

In the example of FIG. 1, since the hydrogen production apparatus 300 is disposed in the hydrogen station 102 and becomes a hydrogen production base, an example of an on-site ST is shown.

The multi-stage accumulator 101 includes a plurality of accumulators 10, 12, and 14. In the example of FIG. 1, the three accumulators 10, 12, and 14 configure the multi-stage accumulator 101.

In the example of FIG. 1, for example, the accumulator 10 functions as a 1st bank having a low use lower limit pressure. The accumulator 12 functions as a 2nd bank having an intermediate use lower limit pressure, for example. The accumulator 14 functions as a 3rd bank having a high use lower limit pressure, for example. However, the present invention is not limited thereto. The accumulators used in the 1st bank to the 3rd bank are replaced as necessary. In the hydrogen station 102, a curdle and/or an intermediate accumulator (not shown) may also be disposed.

Further, in FIG. 1, the suction side of the compressor 40 is connected to the discharge side of the hydrogen production apparatus 300 via a valve 328 by a pipe.

The discharge side of the compressor 40 is connected to the accumulator 10 via a valve 21 by a pipe. Similarly, the discharge side of the compressor 40 is connected to the accumulator 12 via a valve 23 by a pipe. Similarly, the discharge side of the compressor 40 is connected to the accumulator 14 via a valve 25 by a pipe. Similarly, the discharge side of the compressor 40 is connected to the dispenser 30 via a valve 28 by a pipe.

Further, the accumulator 10 is connected to the dispenser 30 via a valve 22 by a pipe. Further, the accumulator 12 is connected to the dispenser 30 via a valve 24 by a pipe. Further, the accumulator 14 is connected to the dispenser 30 via a valve 26 by a pipe.

Further, a discharge pressure of the hydrogen production apparatus 300 is measured by a pressure gauge 318. Further, a pressure in the accumulator 10 is measured by a pressure gauge 11. A pressure in the accumulator 12 is measured by a pressure gauge 13. A pressure in the accumulator 14 is measured by a pressure gauge 15.

Further, a flow rate adjustment valve 29, a flowmeter 27, a cooler 32 (precooler), and a pressure gauge 17 are disposed in the dispenser 30. A flow rate of the hydrogen gas supplied from the multi-stage accumulator 101 or the compressor 40 is measured by the flowmeter 27, and the flow rate is adjusted by the flow rate adjustment valve 29. Then, the hydrogen gas is cooled to a predetermined temperature (for example, −40° C.) by the cooler 32. Therefore, the dispenser 30 fills a fuel tank 202 mounted on an FCV 200 with the cooled hydrogen gas by using, for example, a differential pressure. Further, an outlet pressure (fuel filling outlet pressure) of a filling outlet of the hydrogen gas filled from the dispenser 30 into the FCV is measured by the pressure gauge 17. Further, a control circuit 34 is disposed in or near the dispenser 30 so as to be able to communicate with an on-board device 204 in the FCV 200 (fuel cell vehicle (FCV) powered by the hydrogen gas) that has arrived at the hydrogen station 102. For example, the control circuit 34 is configured to be able to perform wireless communication using infrared rays.

In the FCV 200, the hydrogen gas to be fuel supplied from the dispenser 30 is injected from a reception port (receptacle) into the fuel tank 202 via a fuel passage. The pressure and the temperature in the fuel tank 202 are measured by a pressure gauge 206 and a thermometer 205 provided in the fuel tank 202 or the fuel passage.

Further, if the FCV 200 arrives at the hydrogen station 102, the arrival is detected by the sensor 31, and for example, detected information is output to the control circuit 100 via the control circuit 34 in the dispenser 30. As the sensor 31, for example, a sensor that detects an object (FCV 200) entering the hydrogen station 102 with a laser such as infrared rays can be used. Alternatively, a camera may be used as the sensor 31. By taking an image with the camera, it is possible to more reliably determine that the entrance object is the FCV 200.

The hydrogen gas produced by the hydrogen production apparatus 300 is supplied to the suction side of the compressor 40 in a state of a low pressure (for example, 0.6 MPa). Therefore, a primary-side pressure $P_{IN}$ of the suction side of the compressor 40 is normally low. Under the control of the control circuit 100, the compressor 40 supplies the hydrogen gas supplied at a low pressure from the hydrogen production apparatus 300 to each of the accumulators 10, 12, and 14 of the multi-stage accumulator 101 while compressing the hydrogen gas. In a case of supplying the hydrogen gas from the multi-stage accumulator 101 to the FCV 200, when an amount of hydrogen gas supplied is insufficient or when the multi-stage accumulator 101 is recovering a pressure, under the control of the control circuit 100, the compressor 40 may directly supply the hydrogen gas supplied at a low pressure from the hydrogen production apparatus 300 to the FCV 200 via the dispenser 30 while compressing the hydrogen gas.

The compressor 40 performs compression until an internal pressure of each of the accumulators 10, 12, and 14 of the multi-stage accumulator 101 becomes a predetermined high pressure (for example, 82 MPa). In other words, the compressor 40 performs compression until a secondary-side pressure $P_{OUT}$ of the discharge side becomes the predetermined high pressure (for example, 82 MPa or more). Whether a partner to which the compressor 40 supplies the hydrogen gas is the accumulator 10, 12, or 14 or the dispenser 30 may be determined by controlling opening/closing of the corresponding valves 21, 23, 25, and 28 disposed on the respective pipes by the control circuit 100. Alternatively, control may be performed so that the hydrogen gas is supplied to two or more accumulators at the same time.

In the example described above, the case where control is performed so that the pressure $P_{IN}$ for supplying the hydrogen gas to the suction side of the compressor 40 is reduced to the predetermined low pressure (for example, 0.6 MPa) has been shown. However, the present invention is not limited thereto. The hydrogen gas may be applied to the suction side of the compressor 40 in a state of a pressure higher than the predetermined low pressure (for example, 0.6 MPa) and may be compressed. In the above case, instead of a reciprocating compressor used with the pressure $P_{IN}$ (primary-side pressure) of the suction side fixed to a constant pressure (for example, 0.6 MPa), a high-pressure compressor of the type capable of varying the pressure $P_{IN}$ (primary-side pressure) of the suction side is adopted as the compressor 40. For example, it is preferable to use a booster multi-stage step-up compressor in which the pressure $P_{IN}$ (primary-side pressure) of the suction side is, for example, 20 MPa or less.

The hydrogen gas accumulated in the multi-stage accumulator 101 is cooled by the cooler 32 in the dispenser 30 and is supplied from the dispenser 30 to the FCV 200 having arrived at the inside of the hydrogen station 102.

Figure 2:
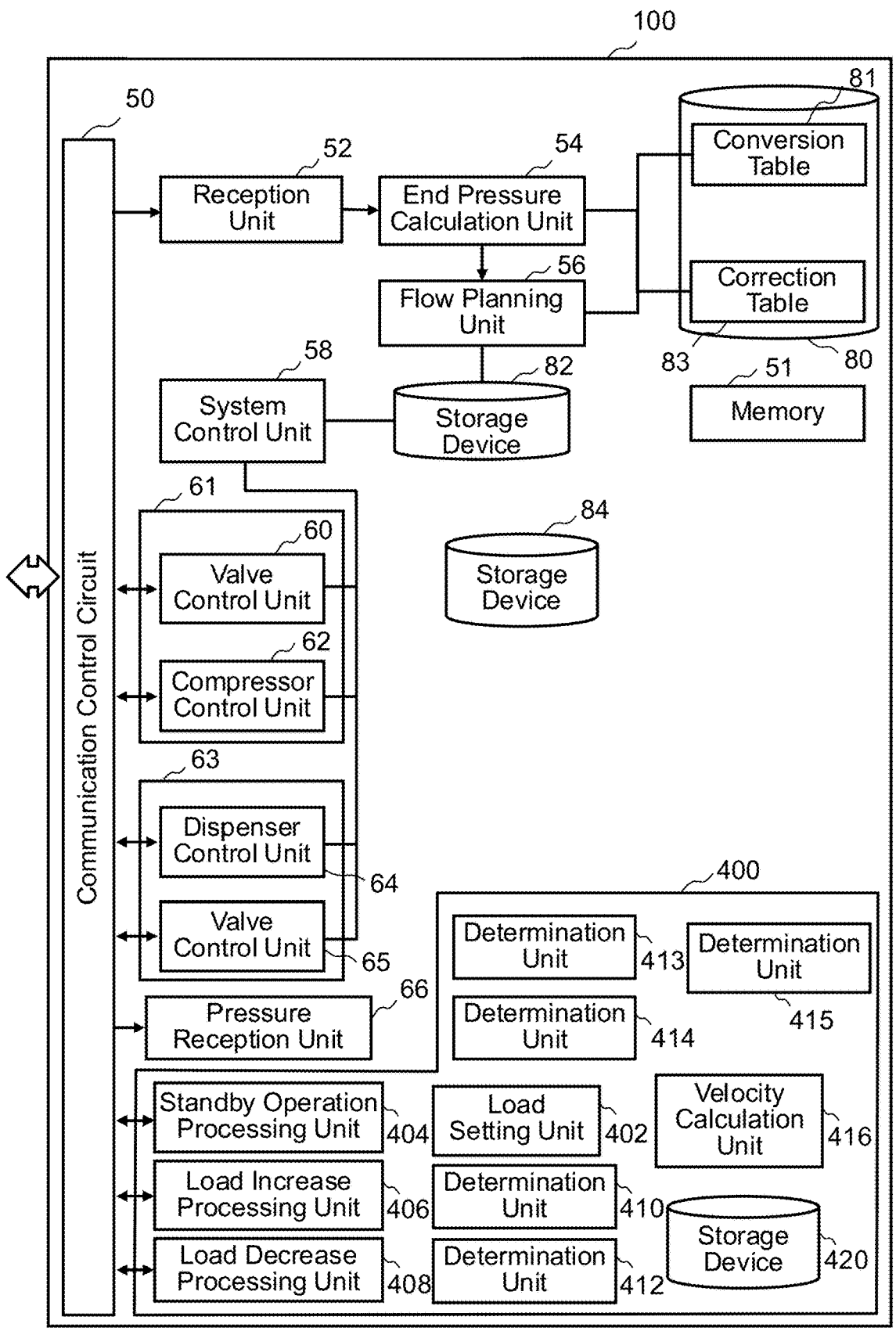
FIG. 2 is a configuration diagram showing an example of an internal configuration of a control circuit in the first embodiment.

FIG. 2 is a configuration diagram showing an example of an internal configuration of the control circuit 100 in the first embodiment. In FIG. 2, a communication control circuit 50, a memory 51, a reception unit 52, an end pressure calculation unit 54, a flow planning unit 56, a system control unit 58, a pressure recovery control unit 61, a supply control unit 63, a pressure reception unit 66, a hydrogen production apparatus control unit 400 (control circuit of the hydrogen production apparatus), and storage devices 80, 82, and 84 such as magnetic disk devices are disposed in the control circuit 100. The pressure recovery control unit 61 has a valve control unit 60 and a compressor control unit 62. The supply control unit 63 has a dispenser control unit 64 and a valve control unit 65. A load setting unit 402, a standby operation processing unit 404, a load increase processing unit 406, a load decrease processing unit 408, a determination unit 410, a determination unit 412, a determination unit 413, a determination unit 414, a determination unit 415, a velocity calculation unit 416, and a storage device 420 such as a magnetic disk device are disposed in the hydrogen production apparatus control unit 400. Each unit such as the reception unit 52, the end pressure calculation unit 54, the flow planning unit 56, the system control unit 58, the pressure recovery control unit 61 (the valve control unit 60 and the compressor control unit 62), the supply control unit 63 (the dispenser control unit 64 and the valve control unit 65), the pressure reception unit 66, and the hydrogen production apparatus control unit 400 (the load setting unit 402, the standby operation processing unit 404, the load increase processing unit 406, the load decrease processing unit 408, the determination unit 410, the determination unit 412, the determination unit 413, the determination unit 414, the determination unit 415, and the velocity calculation unit 416) includes a processing circuit, and an electric circuit, a computer, a processor, a circuit board, or a semiconductor device is included in the processing circuit. Further, a common processing circuit (same processing circuit) may be used for each unit. Alternatively, a different processing circuit (separate processing circuit) may be used for each unit. Input data required in the reception unit 52, the end pressure calculation unit 54, the flow planning unit 56, the system control unit 58, the pressure recovery control unit 61 (the valve control unit 60 and the compressor control unit 62), the supply control unit 63 (the dispenser control unit 64 and the valve control unit 65), the pressure reception unit 66, and the hydrogen production apparatus control unit 400 (the load setting unit 402, the standby operation processing unit 404, the load increase processing unit 406, the load decrease processing unit 408, the determination unit 410, the determination unit 412, the determination unit 413, the determination unit 414, the determination unit 415, and the velocity calculation unit 416), or calculated results are stored in the memory 51 each time.

Further, a conversion table 81 showing a correlation between FCV information such as the pressure, the temperature, and the volume of the fuel tank 202 mounted on the FCV 200, a remaining amount of the hydrogen gas calculated from the FCV information, and filling information such as a final pressure and a final temperature for filling the fuel tank 202 with the hydrogen gas is stored in the storage device 80. Further, a correction table 83 for correcting a result obtained from the conversion table 81 is stored in the storage device 80.

Here, the pressure of each of the accumulators 10, 12 and 14 is preferably maintained as high as possible for rapid filling, because the differential pressure between the fuel tank 202 of the FCV 200 having arrived for filling and the accumulator can be increased. Therefore, it is desired to increase a hydrogen production amount of the hydrogen production apparatus 300 so as to prevent insufficiency in the hydrogen gas for pressure recovering of the accumulator used once. On the other hand, it is difficult for the hydrogen production apparatus 300 to undergo a sudden load fluctuation. When the load is increased, for example, the load can fluctuate at a velocity of load several %/min. For this reason, conventionally, during the business hours of the on-site ST, the operation is continued at the rated value. Further, generally, hydrogen production efficiency is high at the time of the operation at the rated value. However, the total number and filling amount of FCVs 200 arriving for hydrogen gas filling are not uniform among on-site STs disposed in various places. For example, some on-site STs may require 50% of a daily amount of hydrogen gas produced when the hydrogen production apparatus 300 is operated at the rated value, while others may require 30%. Further, the filling amount varies depending on the time of day even during the day. Therefore, when the hydrogen production apparatus 300 is continuously operated at the rated value during the business hours of the on-site ST, there is a limit in the amount of hydrogen gas that can be accumulated in the multi-stage accumulator 101, so that a large amount of hydrogen gas exceeding the limit is left over. Then, the large amount of hydrogen gas left over is discarded. Further, a method for disposing a large number of accumulators in the on-site ST and storing one week's worth of hydrogen gas, due to the fact that it is wasteful to discard the excess hydrogen gas, is not realistic because the facility becomes excessive. Furthermore, in a method for predicting the required production amount of hydrogen gas on the basis of past results and producing the hydrogen gas in the predicted production amount, when the prediction is wrong and more FCVs 200 than the prediction arrive, hydrogen loss (supply disability state) occurs. Therefore, in the first embodiment, the operation load of the hydrogen production apparatus 300 is variably controlled according to the actual arrival of the FCV 200.

Figure 3:
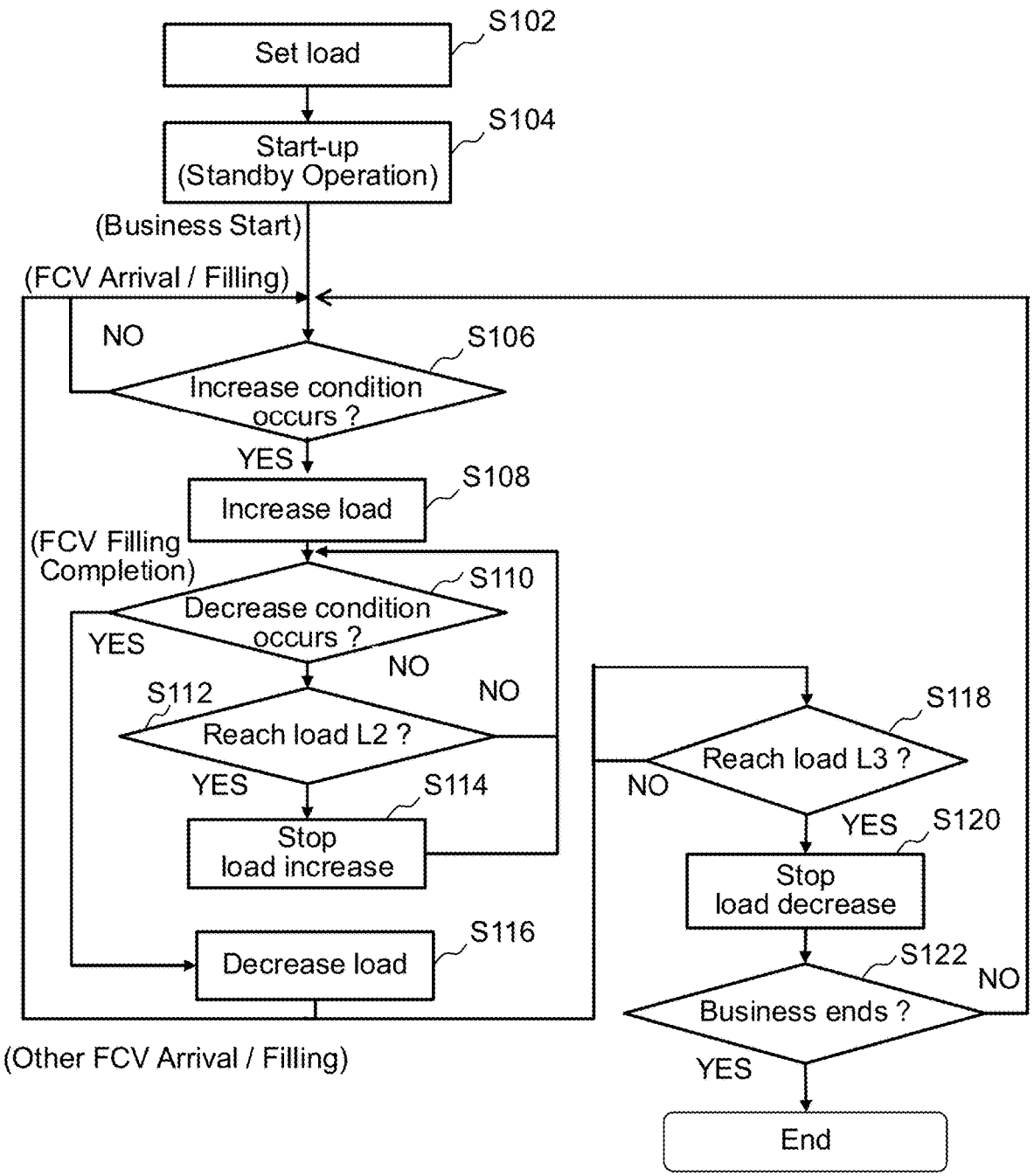
FIG. 3 is a flowchart showing main steps of an operation method for a hydrogen production apparatus in the first embodiment.

FIG. 3 is a flowchart showing main steps of an operation method for the hydrogen production apparatus in the first embodiment. In FIG. 3, the operation method for the hydrogen production apparatus in the first embodiment executes a series of steps such as a load setting step (S102), a start-up step (S104), a load increase switching determination step (S106), a load increase processing step (S108), a load decrease switching determination step (S110), a load arrival determination step (S112), a load increase stop processing step (S114), a load decrease processing step (S116), a load arrival determination step (S118), a load decrease stop processing process (S120), and a business end determination step (S122).

As the load setting step (S102), the load setting unit 402 sets values of a plurality of operation loads to be used under a plurality of conditions. Specifically, an operation load 1 (L1) (first operation load ratio) when the stopped hydrogen production apparatus 300 is started up and is in a standby operation state, an operation load 2 (L2) (second operation load ratio) to be a maximum load when the load needs to be increased, and an operation load 3 (L3) (third operation load ratio) to be a minimum load when the load needs to be decreased are set. A case where the hydrogen production apparatus 300 is operated at the rated value is defined as a load 100%. Further, an amount of hydrogen gas produced is proportional to a load ratio. As the operation load 1, for example, it is preferable to set a predicted value of a hydrogen production amount on the basis of past results and set a load according to the predicted value. For example, it is preferable to use an average value of a previous month or an average value of each day of the week. For example, it is preferable to set a load required for producing an average amount of hydrogen gas required per day. For example, the operation load 1 is set to a load 10 to 30%. As a result, a minimum amount of hydrogen gas required for one day can be produced. As the operation load 2, a value larger than the operation load 1 is set. For example, the operation load 2 is set to the load 100% (rated value). However, the present invention is not limited thereto. When it is clear from the past results that the number of FCVs 200 arriving in a short period is small, the load may be set accordingly. As the operation load 3, a value smaller than the operation load 2 is set. For example, the operation load 3 is set to the same value as the operation load 1. However, the present invention is not limited thereto. As long as a value is smaller than the operation load 2, the value may be larger than the operation load 1. In this way, each of the operation loads 1 to 3 is preset. Information of each of the set operation loads 1 to 3 is stored in the storage device 420.

As the start-up step (S104), the standby operation processing unit 404 starts up the hydrogen production apparatus 300 up to the operation load 1 (first operation load ratio) preset for the rated operation, from the stopped state. Specifically, the following operation is performed. The standby operation processing unit 404 reads the information of the operation load 1 from the storage device 420, and outputs a start command to the hydrogen production apparatus 300 via the communication control circuit 50 so that the hydrogen production apparatus 300 is operated at the operation load 1. The hydrogen production apparatus 300 receives the start command and starts the operation from the stopped state. The hydrogen production apparatus 300 increases the load at a velocity V1 of load several %/min until the load becomes the operation load 1. For example, the load is increased at the velocity V1 of load 3%/min. Then, the hydrogen production apparatus 300 outputs information of a current operation state to the standby operation processing unit 404. The standby operation processing unit 404 manages whether or not the operation according to the start command is executed, outputs a control command as necessary, and controls the hydrogen production apparatus 300. Therefore, the hydrogen production apparatus 300 produces hydrogen gas corresponding to the gradually increasing load. Then, after the load increases to the state of the operation load 1, the standby operation is continued at the operation load 1, and the hydrogen gas in the amount corresponding to the operation load 1 is continuously produced. Further, the valve control unit 60 opens the valve 328 via the communication control circuit 50. As a result, the hydrogen gas produced by the hydrogen production apparatus 300 is supplied to the compressor 40.

From a state where the valves 21, 22, 23, 24, 25, 26, and 28 are closed, the valve control unit 60 opens the valve 25, for example.

Then, the compressor control unit 62 drives the compressor 40, sends the hydrogen gas of the low pressure (for example, 0.6 MPa) while compressing the hydrogen gas, fills the accumulator 14 with the hydrogen gas until the pressure of the accumulator 14 becomes a predetermined pressure P0 (for example, 82 MPa), and performs accumulation of the accumulator 14 (recovers the pressure thereof).

Next, the valve control unit 60 closes the valve 25, and opens the valve 23 instead.

Then, the compressor control unit 62 drives the compressor 40, sends the hydrogen gas of the low pressure (for example, 0.6 MPa) while compressing the hydrogen gas, fills the accumulator 12 with the hydrogen gas until the pressure of the accumulator 12 becomes the predetermined pressure P0 (for example, 82 MPa), and performs accumulation of the accumulator 12 (recovers the pressure thereof).

Next, the valve control unit 60 closes the valve 23, and opens the valve 21 instead.

Then, the compressor control unit 62 drives the compressor 40, sends the hydrogen gas of the low pressure (for example, 0.6 MPa) while compressing the hydrogen gas, fills the accumulator 10 with the hydrogen gas until the pressure of the accumulator 10 becomes the predetermined pressure P0 (for example, 82 MPa), and performs accumulation of the accumulator 10 (recovers the pressure thereof).

As described above, accumulation of the accumulators 10, 12 and 14 can be performed until the pressure becomes the predetermined pressure P0 (for example, 82 MPa). As a result, the differential pressure filling into the FCV 200 by the multi-stage accumulator 101 is prepared. If the FCV 200 does not arrive until the accumulation of the accumulators 10, 12, and 14 is completed, the valve control unit 60 closes the valve 328 and opens an opening valve 319, and hydrogen gas produced after the accumulation is completed is discharged (discarded) to the atmosphere. However, since the hydrogen production apparatus 300 is operated at the operation load 1, an amount of hydrogen gas discarded can be significantly reduced as compared with a case of being operated at the load 100%. The start-up step (S104) is executed at the start of business of the hydrogen station 102, or shortly before the start of business so that the operation state becomes the standby operation state at the start of business. For example, when the operation load 1 is 30% and the operation load can be increased at the velocity of load 3%/min, the start-up work ends in about 10 minutes.

In the above state or during the accumulation of the accumulators 10, 12, and 14, the first FCV 200 arrives at the hydrogen station 102. When the FCV 200 arrives at the hydrogen station 102, the sensor 31 detects the FCV 200, and for example, detected information is output to the control circuit 100 via the control circuit 34 in the dispenser 30. In the control circuit 100, for example, the dispenser control unit 64 receives the detected information via the communication control circuit 50. As a result, the control circuit 100 can grasp that the FCV 200 has arrived at the hydrogen station 102.

When the FCV 200 arrives at the hydrogen station 102, a worker of the hydrogen station 102 or a user of the FCV 200 connects (fits) a nozzle 44 of the dispenser 30 to the reception port (receptacle) of the fuel tank 202 of the FCV 200, and fixes the nozzle 44. When the FCV 200 arrives at the inside of the hydrogen station 102 and the nozzle 44 of the dispenser 30 is connected and fixed to the reception port (receptacle) of the fuel tank 202 of the FCV 200 by the user or the worker of the hydrogen station 102, communication between the on-board device 204 and the control circuit 34 (relay device) is established.

Next, when the communication between the on-board device 204 and the control circuit 34 (relay device) is established, FCV information such as the current pressure and temperature of the fuel tank 202 and the volume of the fuel tank 202 is output (transmitted) in real time from the on-board device 204. The FCV information is relayed by the control circuit 34 and transmitted to the control circuit 100. In the control circuit 100, the reception unit 52 receives the FCV information via the communication control circuit 50. The FCV information is monitored at all times or at predetermined sampling intervals (for example, 10 msec to several seconds) while the communication between the on-board device 204 and the control circuit 34 is established. The received FCV information is stored in the storage device 80 together with reception time information.

The end pressure calculation unit 54 reads the conversion table 81 from the storage device 80, and calculates and predicts a final pressure PF corresponding to the pressure Pa, temperature Ti, and volume V of the fuel tank 202 at the time of initial reception and the outside air temperature T', which have been received. Further, the end pressure calculation unit 54 reads the correction table 83 from the storage device 80, and corrects a numerical value obtained by the conversion table 81 as necessary. When only data of the conversion table 81 has a large error in an obtained result, the correction table 83 may be provided on the basis of a result obtained by an experiment or a simulation. The calculated final pressure PF is output to the system control unit 58.

Next, the flow planning unit 56 creates a filling control flow plan for supplying (filling) the hydrogen gas to the fuel tank 202 of the FCV 200 by the differential pressure using the multi-stage accumulator 101. The flow planning unit 56 creates a plan for the filling control flow including selection of the accumulator (selection of the accumulators 10, 12, and 14) and switching timing of the multi-stage accumulator 101 so that the pressure of the fuel tank 202 becomes the final pressure PF. Control data of the created filling control flow plan is temporarily stored in the storage device 82. When the filling control flow is planned, the flow planning unit 56 sets a pressure increase rate according to the external temperature, and calculates a filling speed corresponding to the pressure increase rate. Further, to suppress a sudden temperature rise, the filling speed corresponding to the pressure increase rate determined according to the external temperature applied during filling is calculated. The pressure increase rate determined according to the external temperature is previously included in the data of the conversion table 81. The filling control flow is planned under these conditions, and a time t (end time 1) (reaching time) from the start of filling at which the pressure reaches the final pressure PF is obtained.

Then, according to the created filling control flow, filling of the hydrogen gas from the dispenser 30 (measuring machine) into the fuel tank 202 mounted on the FCV 200 powered by the hydrogen gas is performed. Specifically, the following operation is performed.

Figure 4:
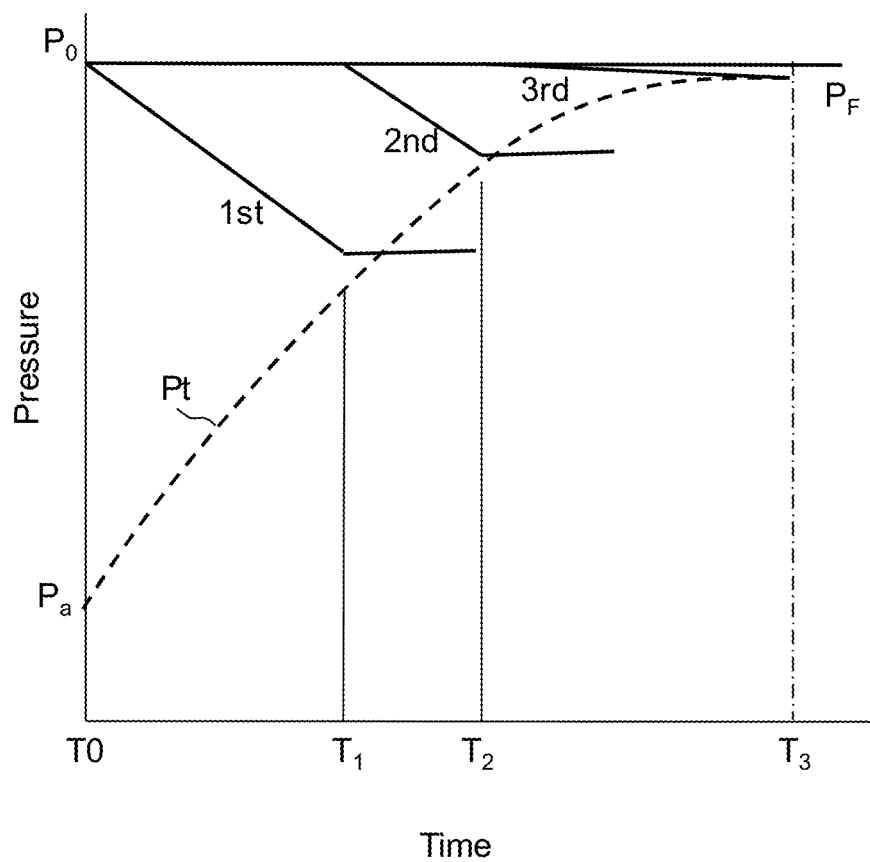
FIG. 4 is a diagram illustrating a filling method in a case of performing differential pressure filling of hydrogen fuel by using a multi-stage accumulator in the first embodiment.

FIG. 4 is a diagram illustrating a filling method in a case of performing differential pressure filling of the hydrogen fuel by using the multi-stage accumulator in the first embodiment. In FIG. 4, a vertical axis indicates a pressure and a horizontal axis indicates a time. In the case of performing the differential pressure filling of the hydrogen fuel on the FCV 200, generally, accumulation of each of the accumulators 10, 12, and 14 of the multi-stage accumulator 101 is previously performed at the same pressure P0 (for example, 82 MPa). On the other hand, the pressure of the fuel tank 202 of the FCV 200 that has arrived at the hydrogen station 102 becomes the pressure Pa. A case where filling starts for the fuel tank 202 of the FCV 200 from the above state will be described.

First, the filling starts from the 1st bank, for example, the accumulator 10 to the fuel tank 202. Specifically, the following operation is performed. Under the control of the system control unit 58, the supply control unit 63 controls the supply unit 106, and supplies the hydrogen fuel from the accumulator 10 to the fuel tank 202 of the FCV 200. Specifically, the system control unit 58 controls the dispenser control unit 64 and the valve control unit 65. The dispenser control unit 64 communicates with the control circuit 34 of the dispenser 30 via the communication control circuit 50, and controls the operation of the dispenser 30. Specifically, first, the control circuit 34 adjusts the opening of the flow rate adjustment valve 29 in the dispenser 30 so that a filling speed becomes the calculated filling speed M. Then, the valve control unit 65 outputs a control signal to the valves 22, 24, and 26 via the communication control circuit 50, and controls opening/closing of each valve. Specifically, the valve 22 is opened and the valves 24 and 26 are kept closed. As a result, the hydrogen fuel is supplied from the accumulator 10 to the fuel tank 202. The hydrogen fuel accumulated in the accumulator 10 by the differential pressure between the accumulator 10 and the fuel tank 202 moves to the side of the fuel tank 202 at the adjusted filling speed, and the pressure of the fuel tank 202 gradually increases as indicated by a dotted line Pt. Accordingly, the pressure (graph indicated by "1st") of the accumulator 10 gradually decreases. Then, at a point of time when the pressure reaches the use lower limit pressure of the 1st bank and the time T1 elapses from the start of filling, an accumulator to be used is switched from the accumulator 10 to the 2nd bank, for example, the accumulator 12. Specifically, the valve control unit 65 outputs a control signal to the valves 22, 24, and 26 via the communication control circuit 50, and controls opening/closing of each valve. Specifically, the valve 24 is opened, the valve 22 is closed, and the valve 26 is kept closed. As a result, since the differential pressure between the accumulator 12 and the fuel tank 202 increases, the filling speed can be kept high.

Then, the hydrogen fuel accumulated in the accumulator 12 by the differential pressure between the 2nd bank, for example, the accumulator 12 and the fuel tank 202 moves to the side of the fuel tank 202 at the same adjusted filling speed, and the pressure of the fuel tank 202 gradually increases as indicated by the dotted line Pt. Accordingly, the pressure (graph indicated by "2nd") of the accumulator 12 gradually decreases. Then, at a point of time when the pressure reaches the use lower limit pressure of the 2nd bank and a time T2 elapses from the start of filling, an accumulator to be used is switched from the accumulator 12 to the 3rd bank, for example, the accumulator 14. Specifically, the valve control unit 65 outputs a control signal to the valves 22, 24, and 26 via the communication control circuit 50, and controls opening/closing of each valve. Specifically, the valve 26 is opened, the valve 24 is closed, and the valve 22 is kept closed. As a result, since the differential pressure between the accumulator 14 and the fuel tank 202 increases, the filling speed can be kept high.

Then, the hydrogen fuel accumulated in the accumulator 14 by the differential pressure between the 3rd bank, for example, the accumulator 14 and the fuel tank 202 moves to the side of the fuel tank 202 at the adjusted filling speed, and the pressure of the fuel tank 202 gradually increases as indicated by the dotted line Pt. Accordingly, the pressure (graph indicated by "3rd") of the accumulator 14 gradually decreases. Then, filling is performed until the pressure of the fuel tank 202 becomes the calculated final pressure PF (for example, 65 to 81 MPa) by the accumulator 14 to be the 3rd bank.

As described above, the fuel tank 202 is filled with the hydrogen gas in order from the 1st bank. In the example described above, the case where the pressure P1 of the fuel tank 202 of the FCV 200 arriving at the hydrogen station 102 is sufficiently lower than the use lower limit pressure of the accumulator 10 to be the preset low pressure bank is shown. As an example, a case of a sufficiently low pressure state such as ½ or less of a pressure at the time of full filling (full tank) is shown. In this case, for example, the three accumulators 10, 12, and 14 are required to perform rapid filling so that the pressure of the fuel tank 202 of the FCV 200 becomes the final pressure PF. However, the FCV 200 arriving at the hydrogen station 102 is not limited to the case where the pressure of the fuel tank 202 is sufficiently low. When the pressure of the fuel tank 202 is higher than, for example, ½ of the pressure at the time of full filling, for example, the two accumulators 10 and 12 may be required. Furthermore, when the pressure of the fuel tank 202 is high, for example, one accumulator 10 may be required. In any case, the accumulator to be used is switched between the accumulators 10, 12, and 14.

If filling (supplying) of the hydrogen gas into the fuel tank 202 of the FCV 200 ends, the nozzle 44 of the dispenser 30 is removed from the reception port (receptacle) of the fuel tank 202 of the FCV 200, and the user leaves the hydrogen station 102 after paying cost according to the filling amount, for example.

On the other hand, the operation of the hydrogen production apparatus 300 is as follows.

As the load increase switching determination step (S106), the determination unit 410 determines whether or not an increase condition to be timing of load increase switching has occurred. For example, it is preferable to use that the sensor 31 detects the arrival of the FCV 200 at the hydrogen station 102 as the increase condition. Alternatively, it is preferable to use the start of filling the FCV 200 with the hydrogen gas as the increase condition. Alternatively, predetermined timing during filling of the FCV 200 with the hydrogen gas may be used as the increase condition. For example, timing several tens of seconds after the start of filling the FCV 200 with the hydrogen gas is used as the increase condition. When the increase condition occurs, the process proceeds to the load increase processing step (S108). When the increase condition does not occur, the process returns to the load increase switching determination step (S106), and the load increase switching determination step (S106) is repeated until the increase condition occurs. Further, it is preferable to add a case where a residual pressure of the accumulator (any one or all of the accumulators 10, 12, and 14) accumulating the hydrogen gas produced by the hydrogen production apparatus 300 is a threshold or less, to the increase condition described above.

As the load increase processing step (S108), at determination (detection) timing (first timing) where the occurrence of the increase condition associated with the arrival of the FCV 200 has been determined (detected), the load increase processing unit 406 increases the operation load of the hydrogen production apparatus 300 to the operation load 2 (second operation load ratio) larger than the operation load 1 (first operation load ratio). In other words, for example, at one of timing where the arrival of the FCV 200 at the hydrogen station 102 has been detected, timing where the start of filling the FCV 200 with the hydrogen gas has been detected, and predetermined timing during the filling of the FCV 200 with the hydrogen gas, the operation load of the hydrogen production apparatus 300 is increased to the operation load 2. Specifically, the following operation is performed. At the determination (detection) timing where the occurrence of the increase condition has been determined (detected), the load increase processing unit 406 reads the information of the operation load 2 from the storage device 420, and outputs a load increase command to the hydrogen production apparatus 300 via the communication control circuit 50 so that the hydrogen production apparatus 300 is operated at the operation load 2. The hydrogen production apparatus 300 receives the load increase command and increases the load from the operation state at the operation load 1. Unless load decrease processing to be described below is started, the hydrogen production apparatus 300 increases the load at the velocity V1 of load several %/min until the load becomes the operation load 2. For example, the load is increased at the velocity V1 of load 3%/min. Then, the hydrogen production apparatus 300 outputs information of the current operation state to the load increase processing unit 406. The load increase processing unit 406 manages whether or not the operation according to the load increase command is executed, outputs a control command as necessary, and controls the hydrogen production apparatus 300. Therefore, the hydrogen production apparatus 300 produces hydrogen gas corresponding to the gradually increasing load. Then, after the load decrease processing is not started and the load increases to the state of the operation load 2, the operation is continued at the operation load 2 and the hydrogen gas in the amount corresponding to the operation load 2 is continuously produced. At that time, the valve control unit 60 closes the open valve 319 and opens the valve 328, via the communication control circuit 50. As a result, the hydrogen gas produced by the hydrogen production apparatus 300 is supplied to the compressor 40.

From a state where the valves 21, 22, 23, 24, 25, 26, and 28 are closed, the valve control unit 60 opens the valve 21, for example. The valve of the accumulator whose pressure has decreased due to use as much as possible is opened.

Then, the compressor control unit 62 drives the compressor 40, sends the hydrogen gas of the low pressure (for example, 0.6 MPa) while compressing the hydrogen gas, fills the accumulator 10 with the hydrogen gas until the pressure of the accumulator 10 to be the 1st bank becomes the predetermined pressure P0 (for example, 82 MPa), and recovers the pressure of the accumulator 10. If filling of the hydrogen gas from the accumulator 10 into the FCV 200 is being performed, the accumulator 10 fills the FCV 200 with the hydrogen gas while recovering the pressure. When the accumulator filling the FCV 200 with the hydrogen gas is switched from the accumulator 10 to the accumulator 12 or the accumulator 14, similarly, the pressure of the accumulator 12 or the accumulator 14 is sequentially recovered.

As described above, the hydrogen gas is sequentially supplied to the multi-stage accumulator 101 whose pressure decreases by filling the FCV 200 with the hydrogen gas. When the hydrogen production apparatus 300 is capable of producing hydrogen gas of 30 kg/h at the load 100% and the filling amount to the FCV 200 is 3 kg/unit, the hydrogen production apparatus 300 can produce the hydrogen gas of 10 units/h. Therefore, a required amount of hydrogen gas can be produced in 6 minutes per unit. For example, if the hydrogen production apparatus 300 is operated at the load 50%, it is possible to produce the hydrogen gas of 5 units/h. Therefore, the required amount of hydrogen gas can be produced in 12 minutes per unit. For example, if the hydrogen production apparatus 300 is operated at the load 30%, it is possible to produce the hydrogen gas of 3 units/h. Therefore, the required amount of hydrogen gas can be produced in 20 minutes per unit. It is assumed that a time of filling of the hydrogen gas into the FCV 200 per unit is, for example, about 5 minutes. If the load increase velocity is 3%/min, the operation load can be increased from 30% to 50% in about 7 minutes. Therefore, even if the second FCV 200 arrives at the hydrogen station 102 during the filling of the first FCV 200 or immediately after the filling of the first FCV 200, about 7 to 8 minutes elapse from the start of filling of the first FCV 200, including a time for attaching and detaching the nozzle 44, until the filling of the second FCV 200 starts. Further, since the accumulators 10, 12, and 14 are not emptied by the filling of the first FCV 200, the amount of hydrogen gas required for the second FCV 200 can be sufficiently secured until the filling of the second FCV 200 starts. Therefore, it is possible to prevent the filling amount from being insufficient.

On the other hand, when the load is continuously increased until the load becomes the operation load 2, even though the second FCV 200 does not arrive, the hydrogen gas produced after the filling of the first FCV 200 and after the pressure recovery of the multi-stage accumulator 101 is completed is left over, so that the hydrogen gas is discarded. Therefore, in the first embodiment, the load is switched as follows.

As the load decrease switching determination step (S110), the determination unit 412 determines whether or not a decrease condition to be timing of load decrease switching has occurred. For example, it is preferable to use the completion of hydrogen filling into the FCV 200 as the decrease condition. Alternatively, it is preferable to use the elapse of a predetermined period after the completion of the hydrogen filling into the FCV 200 as the decrease condition. Alternatively, it is preferable to use that the pressure of the accumulator 10 (12 and 14) accumulating the hydrogen gas produced by the hydrogen production apparatus 300 is the threshold or more as the decrease condition. When the decrease condition occurs, the process proceeds to the load decrease processing step (S116). When the decrease condition does not occur, the process proceeds to the load arrival determination step (S112).

As the load arrival determination step (S112), the hydrogen production apparatus 300 determines whether or not the operation load of the hydrogen production apparatus 300 has reached the operation load 2. Alternatively, the determination unit 413 may determine whether or not the operation load of the hydrogen production apparatus 300 has reached the operation load 2. When the operation load reaches the operation load 2, the process proceeds to the load increase stop processing step (S114). When the operation load does not reach the operation load 2, the process returns to the load decrease switching determination step (S110) while the load increase is continued.

As the load increase stop processing step (S114), the hydrogen production apparatus 300 stops the load increase when the operation load reaches the operation load 2, and continues the operation in the state of the operation load 2.

As described above, when the hydrogen filling into the FCV 200 is not completed until the operation load reaches the operation load 2, the load increase is stopped when the operation load reaches the operation load 2. Further, at timing where it is determined (detected) that the operation load has reached the operation load 2, the load increase processing unit 406 may output a load maintenance command to the hydrogen production apparatus 300 via the communication control circuit 50 so that the hydrogen production apparatus 300 performs the operation maintained at the operation load 2. Then, the process returns to the load decrease switching determination step (S110).

As the load decrease processing step (S116), at determination (detection) timing (second timing) where the occurrence of the decrease condition associated with the completion of hydrogen filling into the FCV 200 has been determined (detected), the load decrease processing unit 408 decreases the operation load of the hydrogen production apparatus 300 to the operation load 3 (third operation load ratio) smaller than the operation load 2 (second operation load ratio). In other words, for example, at one of timing where the completion of hydrogen filling into the FCV 200 has been detected, timing where a predetermined period has elapsed from the completion of hydrogen filling into the FCV 200, and timing where the pressure of the accumulator 10 (12, and 14) accumulating the hydrogen gas produced by the hydrogen production apparatus 300 has become the threshold or more, the operation load of the hydrogen production apparatus 300 is decreased to the operation load 3. Specifically, the following operation is performed. At the determination (detection) timing where the occurrence of the decrease condition has been determined (detected), the load decrease processing unit 408 reads the information of the operation load 3 from the storage device 420, and outputs a load decrease command to the hydrogen production apparatus 300 via the communication control circuit 50 so that the hydrogen production apparatus 300 is operated at the operation load 3. The hydrogen production apparatus 300 receives the load decrease command and decreases the load during increasing of the operation load to the operation load 2 or from the operation state at the operation load 2. The hydrogen production apparatus 300 decreases the load at a velocity V2 of load several %/min until the operation load becomes the operation load 3. For example, the load is decreased at the velocity V2 of load 3%/min. Then, the hydrogen production apparatus 300 outputs information of the current operation state to the load decrease processing unit 408. The load decrease processing unit 408 manages whether or not the operation according to the load decrease command is executed, outputs a control command as necessary, and controls the hydrogen production apparatus 300. Therefore, the hydrogen production apparatus 300 will produce hydrogen gas corresponding to the gradually decreasing load. Then, in order to wait for the arrival of the next FCV 200, the process returns to the load increase switching determination step (S106) and proceeds to the load arrival determination step (S118).

As the load arrival determination step (S118), the hydrogen production apparatus 300 determines whether or not the operation load of the hydrogen production apparatus 300 has reached the operation load 3. Alternatively, the determination unit 414 may determine whether or not the operation load of the hydrogen production apparatus 300 has reached the operation load 3. When the operation load reaches the operation load 3, the process proceeds to the load decrease stop processing step (S120). When the operation load does not reach the operation load 3, the load arrival determination step (S118) is repeated.

As the load decrease stop processing step (S120), the hydrogen production apparatus 300 stops the load decrease when the operation load reaches the operation load 3, and continues the operation in the state of the operation load 3. As described above, when the next FCV 200 does not arrive until the operation load reaches the operation load 3, the load decrease is stopped when the operation load reaches the operation load 3. Further, at timing where it is determined (detected) that the operation load has reached the operation load 3, the load decrease processing unit 408 may output a load maintenance command to the hydrogen production apparatus 300 via the communication control circuit 50 so that the hydrogen production apparatus 300 performs the operation maintained at the operation load 3. Then, the process proceeds to a business hour determination step (S122).

As a business end determination step (S122), the determination unit 415 determines whether or not the business has ended. When the business does not end, the process returns to the load increase switching determination step (S106) in order to wait for the arrival of the next FCV 200. When the business ends, the operation of the hydrogen production apparatus 300 is continued at the operation load 3 until the business starts the next day.

Figure 5:
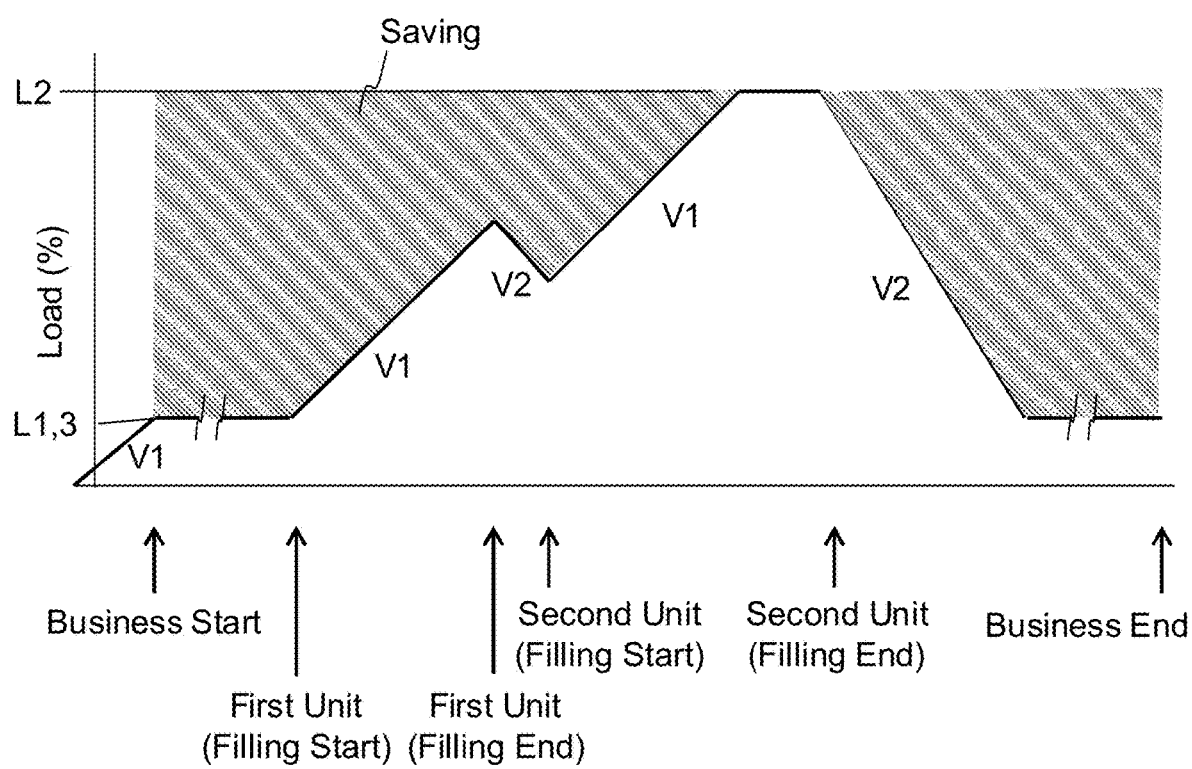
FIG. 5 is a diagram showing an example of a relation between an operation load of the hydrogen production apparatus and an FCV filling situation in the first embodiment.

FIG. 5 is a diagram showing an example of a relation between an operation load of the hydrogen production apparatus and an FCV filling situation in the first embodiment. In FIG. 5, a vertical axis indicates the operation load (%) of the hydrogen production apparatus 300, and a horizontal axis indicates a filling situation of the FCV 200. In the example of FIG. 5, first, the hydrogen production apparatus 300 is started up from a state where the hydrogen production apparatus 300 is stopped up to the operation load 1 (load L1) at the velocity V1. In this state, the business of the hydrogen station 102 starts. When the filling of the first FCV 200 is started, the operation load of the hydrogen production apparatus 300 is increased to the operation load 2 (load L2) at the velocity V1. In the example of FIG. 5, the filling of the first FCV 200 is completed during the increase. Therefore, when the filling of the first FCV 200 is completed, the operation load of the hydrogen production apparatus 300 is decreased to the operation load 3 (load L3) at the velocity V2. In the example of FIG. 5, the filling of the second FCV 200 starts during the decrease. In the first embodiment, the increase in the operating load due to the determination (detection) timing (first timing) of the occurrence of the increase condition for the subsequent FCV (second unit) that arrives at the hydrogen station 102 next to the previous FCV 200 (first unit) takes precedence over the decrease in the operation load due to the determination (detection) timing (second timing) of the occurrence of the decrease condition for the previous FCV 200 (first unit). Therefore, when the filling of the second FCV 200 is started, the operation load of the hydrogen production apparatus 300 is increased to the operation load 2 (load L2) at the velocity V1. As a result, even when the third FCV 200 continues to arrive at the hydrogen station 102 during the filling of the second FCV 200 or immediately after the filling is completed, it is possible to prevent the hydrogen gas from being insufficient. In the example of FIG. 5, the operation load reaches the operation load 2 during the filling of the second FCV 200. After the operation load reaches the operation load 2, the operation of the hydrogen production apparatus 300 is continued at the operation load 2. When the filling of the second FCV 200 is completed, the operation load of the hydrogen production apparatus 300 is decreased to the operation load 3 (load L3) at the velocity V2. In the example of FIG. 5, a case where the third and subsequent FCVs 200 do not arrive until the operation load reaches the operation load 3 is shown. After the operation load reaches the operation load 3, the operation of the hydrogen production apparatus 300 is continued at the operation load 3. After the end of business hours, the operation of the hydrogen production apparatus 300 is continued at the operation load 3 until the business starts the next day. In the example of FIG. 5, the case where the operation loads 1 and 3 have the same value is shown. However, when the operation loads 1 and 3 are different, after the end of business hours, the operation (standby operation: idling operation) of the hydrogen production apparatus 300 may be continued at the operation load 1 until the business starts the next day, and a warm-up operation (a reformer is kept warm but hydrogen is not produced) may be performed, or the operation of the hydrogen production apparatus 300 may be stopped. Further, after the business ends, the setting of the operation loads 1 to 3 may be changed for the next day's business. Of course, the setting of the operation loads 1 to 3 may be changed during business hours. Needless to say, after changing the setting, the operation is controlled according to the latest setting value.

By the above operation method, in FIG. 5, waste of the production amount of hydrogen gas corresponding to an area indicated by a shaded portion can be eliminated as compared with the case where the hydrogen production apparatus 300 is operated at the load 100% from the start of business to the end of business.

Further, the velocity V1 that increases the operation load of the hydrogen production apparatus 300 is calculated by the velocity calculation unit 416. The hydrogen production apparatus 300 can variably adjust the increase velocity V1 and the decrease velocity V2 as long as the velocity is slower than the performance limit of the hydrogen production apparatus 300. Therefore, preferably, the velocity calculation unit 416 variably adjusts the increase velocity V1 in accordance with the residual pressure of the accumulator 10 (14 and 16) accumulating the hydrogen gas produced by the hydrogen production apparatus 300. The pressure of the accumulator 10 (14 and 16) is received by the pressure reception unit 66 from each pressure gauge 11, 13, and 15 (17 and 318). The received pressure data is stored in the storage device 84. For example, when the residual pressure is high, the increase velocity V1 is decreased, and when the residual pressure is low, the increase velocity V1 is increased. As a result, the amount of hydrogen gas to be discarded can be further reduced.

As described above, according to the first embodiment, it is possible to produce hydrogen with less waste in accordance with an actual situation, without increasing a size of a facility.

The embodiments have been described with reference to the specific examples. However, the present invention is not limited to these specific examples. The present invention can also be applied to, for example, a hydrogen production apparatus by electrolysis.

Further, descriptions of parts and the like that are not directly necessary for explanation of the present invention, such as the apparatus configuration and the control method, have been omitted. However, the necessary apparatus configuration and control method can be appropriately selected and used.

In addition, all hydrogen production apparatus operation methods and hydrogen production apparatus control devices, which include the elements of the present invention and are capable of being appropriately changed in design by those skilled in the art, are included in the scope of the present invention.

What is claimed is:

1. A hydrogen production apparatus that produces hydrogen gas to be supplied to a hydrogen storage tank, the hydrogen production apparatus comprising a control circuit configured
    to control an operation load ratio of the hydrogen production apparatus to a predetermined operation load ratio;
    to increase the operation load ratio of the hydrogen production apparatus to a first operation load ratio larger than the predetermined operation load ratio at first timing; and
    to decrease the operation load ratio of the hydrogen production apparatus to the predetermined operation load ratio from the first load operation ratio at second timing,
    wherein an increase in the operation load ratio at the first timing takes precedence over a decrease in the operation load ratio at the second timing.

2. The hydrogen production apparatus according to claim 1, wherein the control circuit is configured to determine whether or not the first timing has occurred.

3. The hydrogen production apparatus according to claim 2, wherein the first timing is a timing to be higher hydrogen demand than a predetermined value.

4. The hydrogen production apparatus according to claim 2, further comprising one or more accumulators configured to accumulate the hydrogen gas, wherein the first timing is a timing to be lower hydrogen gas accumulated by the accumulators than a predetermined value.

5. The hydrogen production apparatus according to claim 4, wherein the control circuit is configured to stop the increase in the operation load ratio at the first timing when the operation load ratio of the hydrogen production apparatus reaches the first operation load ratio.

6. The hydrogen production apparatus according to claim 2, wherein the control circuit is configured to determine whether or not the second timing has occurred.

7. The hydrogen production apparatus according to claim 6, wherein the second timing is a timing to be lower hydrogen demand than a predetermined value.

8. The hydrogen production apparatus according to claim 7, further comprising one or more accumulators configured to accumulate the hydrogen gas, wherein the second timing is a timing to be higher hydrogen gas accumulated by the accumulators than a predetermined value.

9. The hydrogen production apparatus according to claim 6, wherein the control circuit is configured to determine whether or not the operation load ratio of the hydrogen production apparatus reaches the predetermined operation load ratio after the second timing has occurred.

10. The hydrogen production apparatus according to claim 9, wherein the control circuit is configured to keep the operation load ratio of the hydrogen production apparatus to the predetermined operation load ratio until the first timing has occurred.

11. The hydrogen production apparatus according to claim 10, wherein the control circuit is configured to keep the operation load ratio of the hydrogen production apparatus to the predetermined operation load ratio, and to continue to increase the operation load ratio of the hydrogen production apparatus to the first operation load ratio in case the second timing has occurred during the increase in the operation load ratio at the first timing.

12. A method for producing hydrogen gas to be supplied to a hydrogen storage tank, comprising:
    controlling an operation load ratio of the hydrogen production apparatus to a predetermined operation load ratio;
    increasing the operation load ratio of the hydrogen production apparatus to a first operation load ratio larger than the predetermined operation load ratio at first timing; and
    decreasing the operation load ratio of the hydrogen production apparatus to the predetermined operation load ratio from the first load operation ratio at second timing,
    wherein an increase in the operation load ratio at the first timing takes precedence over a decrease in the operation load ratio at the second timing.

* * * * *